L. A. THOMPSON.
MALTED MILK CONFECTION.
APPLICATION FILED JULY 15, 1914.
1,127,114.
Patented Feb. 2, 1915.
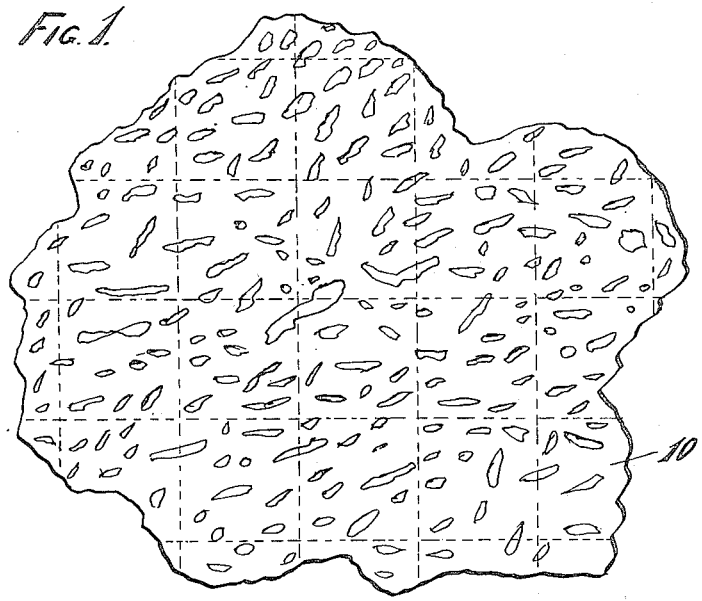
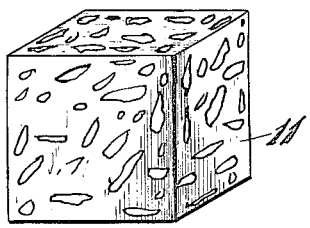
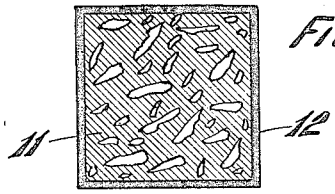
WITNESSES
INVENTOR
Livingston A. Thompson
Katherine Holt
ATTORNEY

UNITED STATES PATENT OFFICE.

LIVINGSTON A. THOMPSON, OF WAUKESHA, WISCONSIN.

MALTED-MILK CONFECTION.

1,127,114.  Specification of Letters Patent.  Patented Feb. 2, 1915.

Application filed July 15, 1914. Serial No. 851,075.

*To all whom it may concern:*

Be it known that I, LIVINGSTON A. THOMPSON, a citizen of the United States, and resident of Waukesha, in the county of Waukesha and State of Wisconsin, have invented new and useful Improvements in Malted-Milk Confections, of which the following is a description, reference being had to the accompanying drawings, which are a part of this specification.

This invention has for its object to provide a candy or confection of malted milk in its foraminous state as it is taken from the evaporating pan, but cut into convenient sizes and shapes and coated with chocolate or other covering material to protect it from moisture.

Heretofore malted milk has been prepared in tablet form by first grinding the sponge-like cake as it comes from the evaporator into a powdered form and then compressing it into tablets and coating these tablets with sugar or chocolate.

The present invention contemplates the sawing of the rough, sponge-like or foraminous cake into cubical blocks without grinding or pulverizing and without disturbing the foraminous condition, and then dipping such blocks in confectioners' sugar to form a chocolate coating which will effectively protect the malted milk from the action of moisture in the air.

With the above and other objects in view the invention consists in the chocolate coated malted milk confection as herein claimed and all equivalents.

Referring to the accompanying drawing in which like characters of reference indicate the same parts in the different views: Figure 1 is a view of a rough piece of malted milk as it is taken from the evaporating pan, with dotted lines therethrough showing the lines of cut to which it is subjected in cutting it into cubes; Fig. 2 is a perspective view of one of the cubes cut therefrom; and, Fig. 3 is a sectional view through one of the cubes after it has received its moisture proof coating.

In these drawings 10 indicates the rough piece of malted milk as it is broken from the cake formed in the evaporating pan. The product in this state is honey-combed, with large and small openings, resembling a sponge or a piece of coke. The rough piece of malted milk is sawed into blocks or cubes 11 without crushing or disturbing the naturally porous state thereof, and such cubes are dipped in confectioners' chocolate so as to completely surround the cube with a chocolate coating 12 that will protect the malted milk from the action of moisture in the air. Such protection is necessary, for malted milk when exposed to air is very soon affected by the moisture but with this protection either in the form of a chocolate coating or a sugar coating or any other moisture proof coating which may be substituted within the scope of the invention will protect the malted milk indefinitely. The bulky form of the malted milk with the air spaces throughout not only renders it more easily crushed in the mouth, but enables the saliva to come in contact with greater areas of thin surfaces so as to more thoroughly dissolve the malted milk and thus greatly increase its strength of flavor and enable the flavor of the chocolate coating and the flavor of the malted milk to be blended instead of acting separately on the sense of taste as with the usual chocolate coated malted milk tablets where the density of the compressed pulverized malted milk renders it less soluble than the chocolate coating.

What I claim as new and desire to secure by Letters Patent is:

1. As an article of food, a confection consisting of a foraminous body of malted milk provided with a moisture proof coating.

2. As an article of food, a confection consisting of a foraminous body of malted milk provided with a moisture proof coating having a flavor to be blended with that of the malted milk.

3. As an article of food, a confection consisting of a foraminous body of malted milk provided with a coating of chocolate.

4. The method of producing a confection as an article of food consisting in the cutting of the cake of malted milk as it is taken from the evaporating pan into cubes without crushing or disturbing its foraminous state and dipping the same in confectioners' chocolate.

In testimony whereof, I affix my signature, in presence of two witnesses.

LIVINGSTON A. THOMPSON.

Witnesses:
 R. S. CALDWELL,
 KATHERINE HOLT.